United States Patent [19]
Roth et al.

[11] Patent Number: 5,397,112
[45] Date of Patent: Mar. 14, 1995

[54] FLUID-FILLED ELASTOMERIC SUSPENSION BUSHING

[75] Inventors: Stephen F. Roth, Port Clinton; Harold H. Henry, III, Huron, both of Ohio

[73] Assignee: The Pullman Company, Lebanon, N.J.

[21] Appl. No.: 238,718

[22] Filed: May 5, 1994

[51] Int. Cl.$^6$ .............................. F16F 9/10; F16M 7/00
[52] U.S. Cl. .................. 267/140.12; 29/897.2; 267/219; 267/152
[58] Field of Search .................. 267/140.12, 219, 220, 267/140.11, 140.13, 140.14, 140.15, 35, 152, 153, 141, 141.2; 29/897.2, 436, 446, 508, 428, 450; 180/300; 248/636, 562, 638

[56] References Cited

U.S. PATENT DOCUMENTS

| | | |
|---|---|---|
| 4,159,091 | 6/1979 | Le Salver et al. |
| 4,693,456 | 9/1987 | Kanda . |
| 4,822,010 | 4/1989 | Thorn . |
| 4,856,764 | 8/1989 | Kanda . |
| 4,964,623 | 10/1990 | Thorn .............................. 267/140.12 |
| 4,998,345 | 3/1991 | Funahashi et al. ............. 29/897.2 |
| 5,042,785 | 8/1991 | LeFol et al. . |

FOREIGN PATENT DOCUMENTS 0009120  4/1980  European Pat. Off. .

OTHER PUBLICATIONS

Cleavebloc ® Bearings, Catalog 2 Sheets, Mid 1970's.
Iso-Lube Bearings, Catalog 4 Sheets, 1972.
Silentbloc ® Rubber-Metal Technology, 4 Sheets, Aug. 1, 1991.
Heavy Duty Torque Rod Replacement Catalog, 8 Sheets, Aug. 1, 1990.
Your Quality of Ride Resource, Catalog, 8 Sheets, Jul. 10, 1990.

*Primary Examiner*—Douglas C. Butler
*Attorney, Agent, or Firm*—William Squire

[57] ABSTRACT

A circular cylindrical elastomeric member is formed with an annular recess and two spaced apart pockets in communication with the recess. An outer metal tube receives an inner ring in interference fit in the tube bore, the ring having at least one peripheral depression in an outer surface and a pair of spaced apertures through the ring each communicating with a different corresponding aperture forming at least one channel communicating with the pockets and apertures which are congruent with the pockets. The member is axially forced into the ring and outer tube while submerged in an imcompressible hydraulic fluid to radially compress and elongate the member during member insertion and fill the channel and pockets with the fluid. The ring seats in the member recess. An inner tube is then axial forced into the bore of the elastomeric member and locked to the member by the radial compressive forces without vulcanization or a bonding agent.

18 Claims, 2 Drawing Sheets

FLUID-FILLED ELASTOMERIC SUSPENSION BUSHING

BACKGROUND OF THE INVENTION

The present invention relates to a fluid-filled elastomeric suspension bushing.

Bushings typically used in automobile suspensions are expected to damp low frequency large displacement oscillations caused by road irregularities such as tar strips, pot holes and braking loads. Such bushings are also expected to contribute to high frequency acoustic isolation from relatively small displacements caused by road and tire noise.

The use of fluid-filled elastomeric bushings for use in automobile suspensions has previously been proposed. However, such proposals have entailed costly bushings, often of complex design, having shorter useful lives than conventional bushings and entailing more complex manufacturing procedures. These are described in more detail below.

There are bushings manufactured by the assignee of the present invention in which an elastomeric cylindrical member with a central axial bore is axially inserted into a metal outer tube. An inner metal tube may then be inserted into the elastomeric member bore. The elastomeric member has an initial outside diameter which is larger than the inside diameter of the outer tube and an initial length which is shorter than the length of that tube. The initial shape and size of the elastomeric member before it is inserted into the outer tube and before the inner tube is inserted into the elastomeric member bore determine the final shape and size of the elastomeric member. The elastomer member is inserted into the outer tube by progressively forcing the elastomeric member through a funnel-like device, the output end of which temporarily communicates with the interior of the outer tube.

Axial movement of the elastomeric member through the funnel progressively decreases the member diameter and increases its length until the diametrically decreased and lengthened elastomeric member resides within the outer tube. The inner metal tube may then be subsequently inserted into the central bore of the elastomeric member. The above described bushings and other prior art non-fluid bushings are generally only partially effective in damping either low frequency large displacement oscillations or isolating high frequency small displacement oscillations as illustrated by the dashed line curves in FIGS. 8 and 9, which curves represent the same parameters in both Figures. As seen, the damping characteristics increase gradually with frequency, but do not address resonant frequencies of particular concern such as low frequency oscillations at frequency $f_1$, FIG. 8, or high frequency oscillations in the region of frequency $f_2$, FIG. 9. Low frequencies in this application are, for example about 20 Hz or less and refer to vehicle shake and high frequencies are, for example, above 50 Hz.

To meet this problem, there are available tunable bushings which use an incompressible fluid contained in a plurality of pockets formed in the elastomeric material which are in communication with each other via a connecting channel. A ring over lies the elastomeric bushing and has openings corresponding to the pockets and a depression corresponding to the channel communicating with the pockets.

The problem with this arrangement is that the elastomeric bushing needs to be bonded to the inner tube member in a mold apparatus. The bonding is provided by coating the inner tube with a bond agent prior to insertion into the mold apparatus which injection molds, i.e., vulcanizes, the rubber elastomeric member to the inner tube. A bonding agent is costly and environmentally undesirable because of the undesirable chemicals employed.

A further problem is complexity of manufacture. After the above vulcanizing step, the elastomer-tube assembly then needs to be attached to the ring and to the outer tube. The ring is placed within the outer tube with clearance therebetween and they are then placed over the elastomer member with clearance between the ring and outer tube and the elastomeric member. The outer tube is then radially compressed with a die about 5–10% to secure the ring and outer tube to the elastomer member. The assembly during the die compressing step may be immersed in the desired damping fluid to fill the pockets and channel with the fluid or the fluid may be injected into the pockets and channel later. The use of the bonding agent together with the relatively complex assembly result in a costly device. A further problem with this assembly is durability. The life of such a bushing is not as long as needed for automotive applications, thus requiring premature bushing replacement. This is undesirable.

The present inventors recognize a need for a low cost tunable fluid-filled hydroelastic bushing which effectively selectively damps or isolates oscillations of a given frequency and which is inexpensive, simple in design, durable and expedient to manufacture.

SUMMARY OF THE INVENTION

A fluid-filled, elastomeric bushing according to the present invention comprises a generally cylindrical, elastomeric member having a central axial bore therethrough defining a bore axis and a given outer diameter and a pair of diametrically opposed pockets in the outer surface thereof. A cylindrical ring has at least one peripheral depression in the outer surface thereof and a pair of diametrically opposed apertures therethrough, the at least one depression communicating with the apertures, the ring surrounding the elastomeric member and being located with each aperture congruent with at least a portion of a corresponding different pocket. An inner cylindrical member, which may be a tube, is inserted in the elastomeric member axial bore.

An outer tube surrounds the elastomeric member and the ring, an inner wall of the outer tube being engaged with the ring and closing the pockets, and the depression and the apertures of the ring to form, respectively, at least one closed peripheral channel and a pair of closed chambers in communication with the at least one channel and with each other via the at least one channel, the outer tube having an inner diameter smaller than the elastomeric member given diameter for compressing the elastomeric member at least about 15% wherein the elastomeric member locks to the inner and outer tube by static friction forces without an adhesive and vulcanization. An incompressible fluid fills the chambers and the channel.

The tubes in one embodiment are coupled to supports receiving forces which alternately compress the elastomeric member to alter the relative sizes of the chambers. Such alteration of the chamber sizes pumps the fluid between the chambers via the channel. The alternating compression of the elastomeric member and the pumping of the fluid together damp the transfer of the forces from the one tube to the other tube. The forces act transverse to and torsionally relative to the bore axes of the elastomeric member, the ring and the tubes.

A method of making a fluid-filled, elastomeric damping bushing according to an embodiment of the present invention comprises forming a generally cylindrical, elastomeric member having a central axial bore therethrough and an outer diameter and a pair of diametrically opposed pockets in the outer surface thereof. Forming a cylindrical ring having an outer diameter and at least one peripheral depression in the outer surface thereof and a pair of diametrically opposed apertures therethrough, the at least one depression communicating with the apertures. Forming an outer tube having a bore with an inner diameter smaller than the elastomeric member outer diameter and the outer diameter of the ring and forcing the ring into the outer tube bore in interference fit therewith, an inner wall of the outer tube closing the pockets and the depression and the apertures of the ring forming, respectively, at least one closed peripheral channel and a pair of closed chambers in communication with the at least one channel and with each other via the at least one channel. Axially forcing the elastomeric member into the bore of the outer tube and ring so the outer tube radially compresses and elongates the elastomeric member until the outer tube and ring surround the elastomeric member and locate the ring with the apertures congruent with at least a portion of the pockets, the outer tube radially compressing the elastomeric member. Then axially forcing an inner cylindrical member which may be a tube into the elastomeric member axial bore and filling the chambers and the channel with an incompressible fluid.

DETAILED DESCRIPTION OF THE PREFERRED EMBODIMENTS

Figure 1:
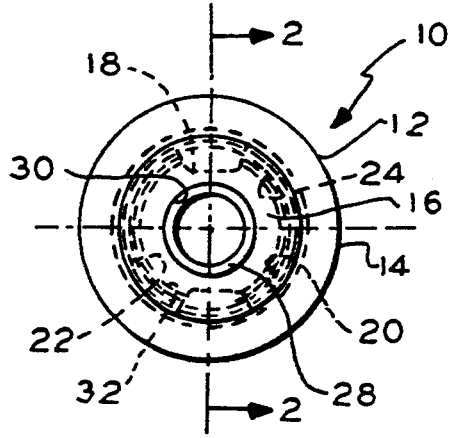
FIG. 1 is an end view of one embodiment of a fully assembled bushing according to one embodiment of the present invention.
Figure 2:
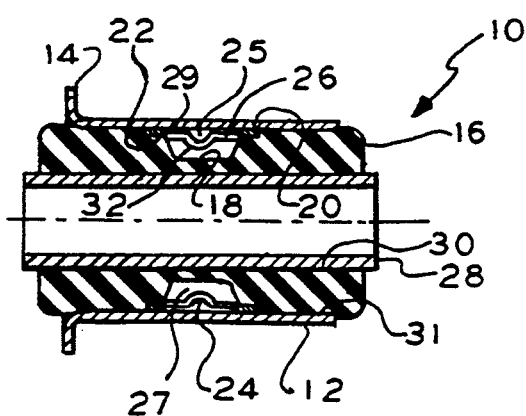
FIG. 2 is a sectional view of the bushing of FIG. 1 taken along lines 2—2.

In FIGS. 1 and 2, a fully assembled suspension bushing 10 according to one embodiment of the present invention includes an outer metal, for example, steel, tube 12 having a flange 14 surrounding an elastomeric member 16. The elastomeric member 16, which may be natural rubber formulated with various fillers typically used for bushings of the type used in the present application, for example, reinforcing agents and various chemicals, is generally circular cylindrical and has a pair of diametrically opposed pockets 18 formed in the outside surface of the member 16. The elastomeric member 16 preferably has a circumferential recess 20 in its outer surface, which recess communicates with the pockets 18.

Figure 5:
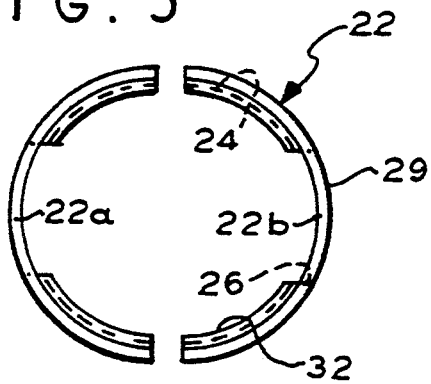
FIG. 5 is an end view of two mirror image ring members which together form a composite ring in the embodiment of FIGS. 1 and 2.
Figure 7:
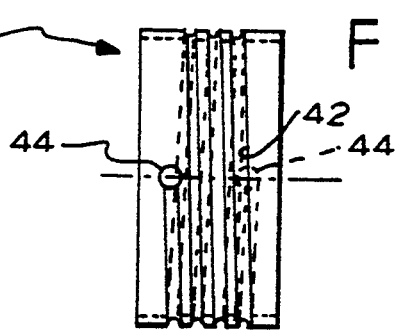
FIG. 7 is a front elevation view of a second embodiment of a ring in accordance with the present invention.

Encircling the elastomeric cylinder 16 is a ring 22, which may be, for example, steel or plastic material, and which comprises two halves 22a and 22b, FIG. 5, or, in the alternative, the ring may comprise an integral unitary annular member, such as ring 40, FIG. 7. The ring 22 is seated in the recess 20. The ring 22 has a circumferential peripheral depression 24 formed in its outer surface and a pair of diametrically opposed apertures 26 formed through its thickness. The depression 24 has an inner wall 32 and intersects the apertures 26. The apertures 26, when the ring is seated in the recess 20, are congruent with the pockets 18. The apertures 26 in this embodiment are about the same in peripheral dimension as the corresponding pocket 18, but this is not essential as will be explained in connection with the ring of FIG. 7.

The outer tube 12 surrounds a major portion of the elastomeric member 16 and surrounds the ring 22. The inner wall surface of the outer tube 12 abuts the outer wall surface of the ring 22 in interference fit, forming a fluid tight seal therewith and, thus, encloses the depression 24 and the aperture 26 and pocket 18 pairs to form respectively a set of four diametrically opposed mirror image closed peripheral channels 25 and a pair of diametrically opposed closed chambers 27 in communication with the channels 25. The chambers 27 each comprise a pocket 18, an overlying aperture 26 and the encircling portion of tube 12. Notwithstanding the presence of the channels 25, the interference fit of the tube 12 with the ring 22 also seals the chambers 27 in the regions adjacent to the channels.

The ring 22, FIG. 5, which is shown in exploded view, has an outer circular surface 29 formed by the members 22a and 22b in their abutting condition of FIG. 1. The diameter of surface 29 formed by the abutting members 22a and 22b of ring 22 is greater than the diameter of the inner surface 31 of the outer tube 12, FIG. 2, so that the ring 22 is retained in the bore of the tube 12 by relatively high static friction forces in interference fit.

The ring 22 is axially press fit into the bore of the tube 12, the interference being in the order of about several thousandths of an inch, by way of example. As a result, the annular outer surfaces 29 of the two ring members 22a and 22b essentially form a single circular outer surface 29. The abutting joints between members 22a and 22b are forced together by the interference fit. This forced abutment fluid seals the abutting joints of the members 22a and 22b. Also, the interference fit of the ring 22 to the inner surface 31 of outer tube 12 fluid seals these abutting interfaces so that inserted hydraulic fluid to be explained below is confined solely to the channels 25 and pockets 29.

An inner tube 28, preferably steel, is within central bore 30 of the elastomeric member 16. In use, the inner tube 28 is coupled to a member such as a portion of an automobile suspension with a nut and bolt (not shown) or the like and the outer tube 12 is mounted or coupled to an automobile chassis. Oscillatory forces applied between the outer tube 12 and the inner tube 28—due, for example, to surface irregularities of the road—are generally transverse or perpendicular to the axis of the bushing 10 and cause the chambers 27 to change in volume by virtue of relatively low frequency oscillating compression of adjacent portions of the elastomeric cylinder 16 at pockets 18. Compression of the cylinder 16 causes fluid with which the chambers 27 and the peripheral channels 25 are filled to be pumped between the chambers. As is known, this pumping action damps these low frequency periodic forces and prevents or limits their being transferred between the tubes 12 and 28. The alternating compression of the member 16 also effects damping of these low frequency forces. Damping by both fluid pumping and compression of the elastomeric member 16 is effective to damp and isolate low frequency forces. High frequency forces are isolated between the inner and outer tubes and, therefore, treated somewhat differently as explained below.

Figure 3:
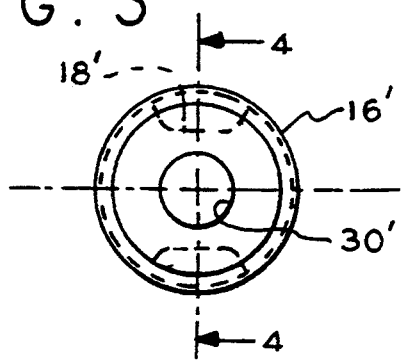
FIG. 3 is an end view of an elastomeric member used in the bushing of FIGS. 1 and 2.
Figure 4:
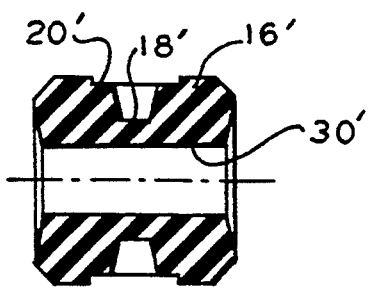
FIG. 4 is a sectional view taken along lines 4—4 in FIG. 3.

In FIGS. 3 and 4, the elastomeric member 16 appears as member 16' before it is surrounded by the ring 22 and the outer tube 12. In its natural state, the member 16' is axially shorter and diametrically larger than when surrounded by the outer tube 12. The pockets 18' and the recess 20' are elongated axially and compressed radially by outer tube 12 and ring 22 to form respective pockets 18 and recess 20. The member 16 assumes the configuration shown in FIGS. 1 and 2 in response to the radial compression. The compression may be in the range of about 15 to 60% and preferably is in the higher range value at about 60%. This compression also elongates member 16 by about 50 to 100%, and preferably 75 to 100%, the latter-most elongation being preferred.

The compression is obtained by progressively forcing the member 16' in the axial direction in a funnel device (not shown) to radially compress the member 16' to the approximate diameter of member 16, FIG. 2, i.e., the diameter of the bore of outer tube 12. In this manner a relatively high degree of compression is obtained. This is to be compared to a maximum compression of about 5-10% obtained in the prior art by die compressing the outer tube into the elastomer member as discussed more fully in the introductory portion. The higher compression is advantageous for reasons discussed below.

Peripheral annular segmented protrusions 32 are on the inside surfaces of the ring 22. The protrusions 32 are produced by the formation of the depressions 24 in the ring members 22a and 22b. When member 16' is radially compressed and axially elongated when inserted into the tube 12, the axially lengthened recess 20 somewhat mirrors the width of the ring 32 which snap fits and seats in the lengthened recess 20 as the member 16' is inserted into the outer tube 12. The outer tube 12 at this time has the ring 22 secured internally thereto as discussed above. The axial forces of the member 16' during insertion do not dislodge the ring 22 from its attachment to the outer tube 12 even in the presence of the relatively high radially compressive forces on the elastomeric member 16. The member 16' slips over the ring during the insertion and assumes the shape as shown in FIG. 2.

The protrusions 32 deform the member 16 when ring 22 is seated in the recess 20. In the alternative, corresponding grooves may be formed in the member 16' to receive the protrusions 32.

The member 16' is preferably inserted into the outer tube 12 with the ring 22 attached to tube 12 while the entire assembly is immersed in a body of appropriate hydraulic incompressible liquid. In this way, the member 16', the pockets 18' and the recess 20' are axially elongated and diametrically decreased to assume the configurations of recesses 20 and pockets 18 as shown in FIG. 2 while submerged in the hydraulic liquid. This fills the channels 25 and the closed chambers 27 with the hydraulic fluid during the insertion. The inner tube 28 is then axially inserted into the central bore 30 of the elastomeric cylinder 16.

The higher compression obtained is important because it produces several desirable effects. One effect is prolonged life. The elastomer due to the higher compression becomes more inelastic than a lower compressed elastomer of the same material. Also, it is believed that the microstructure of the elastomeric material changes due to the compressive loads. This change in structure limits the radial displacement of the bore 30 during use wherein the inner tube 28 is subjected to radial forces relative to the outer tube 12. This limited radial distortion and change in structure of the member 16 limits the wear and tear of the elastomeric material prolonging its life.

Also, significantly, the higher compression increases the radial forces of the elastomer member 16 on the inner tube to such a degree that no adhesive or additional bonding medium, such as vulcanization bonding, needs to be used to lock the member 16 to inner tube 28. The compression obtained by prior art die compressed outer tubes as discussed in the introductory portion is used with vulcanization and a bond agent. This compression does not provide such locking of the elastomer member to the inner tube requiring further undesirable and costly bonding medium and steps.

Since the bushing 10 is subjected to torsional forces to be isolated between the inner and outer tubes in use, slippage of the elastomeric member 16 relative to the inner tube is not desired as it may become dislodged from its position. The locking of the elastomeric member to the inner tube is critical and requires a strong bond therebetween. This locking is achieved in the present bushing solely by the compressive forces of the elastomeric member on the inner tube. This locking action is not possible in the prior art tuned hydraulic bushings without an adhesive or vulcanization bonding process as occurs when rubber is injected onto the inner tube in a mold at elevated temperatures.

In operation, the inner tube 28 is secured to one member of an automotive system and the outer tube 12 is secured to a second member of the automotive system to be vibration damped or isolated from the one member. Other kinds of systems needing vibration damping or isolation may also be used with a bushing 10 of the present invention. The bushing 10 provides dynamic selective tuned vibration damping or isolation between the outer tube 12 and the inner tube 28. Axial and rotational relative forces, created by an automotive suspension system, for example, between the inner and outer tubes are either damped or isolated by the elastomeric material and by the tuned fluid action of the hydraulic liquid in the bushing channels 25 and chambers 27, depending upon the frequency of the vibration and the specific construction of the ring. The bushing 10, for example, with ring 22 is employed for high frequency isolation.

Figure 6:
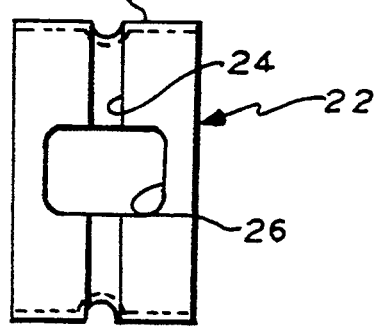
FIG. 6 is a representative front elevation view of one of the members of FIG. 5.

In contrast, a bushing such as bushing 10 with a ring such as ring 40, FIG. 7, in place of ring 22, is used for low frequency damping. In FIG. 7, ring 40 according to a second embodiment of the present invention is shown for damping low frequency displacements. The ring 40 has a different cross-section than the ring 22 in FIGS. 2, 5 and 6. Specifically the ring 40 is a unitary structure (not comprising two halves). The ring 40 has a helical depression 42 which winds about the ring 40 in a number of adjacent spaced turns. The depression 42 is significantly narrower than the depression 24 of ring 22, FIG. 6, and longer. For example, the depression 42 comprises four turns whereas the depression 24 comprises essentially one turn intersected by the apertures 26.

The depression 42, FIG. 7, terminates at opposing ends in like circular apertures 44. The apertures 44 are significantly smaller in cross sectional area than apertures 26 of FIG. 6. However, this is merely to permit more turns of the depression 42 in a given axial width of the ring 40. The apertures 44 are each congruent with a portion of a corresponding elongated pocket 18 of the member 16 of FIG. 2. Thus fluid flowing in the channel formed by depression 42 flows into the pockets 18 through the apertures 44. The apertures 44 are axial spaced from one another in different planes, but this is a matter of convenience only.

Figure 8:
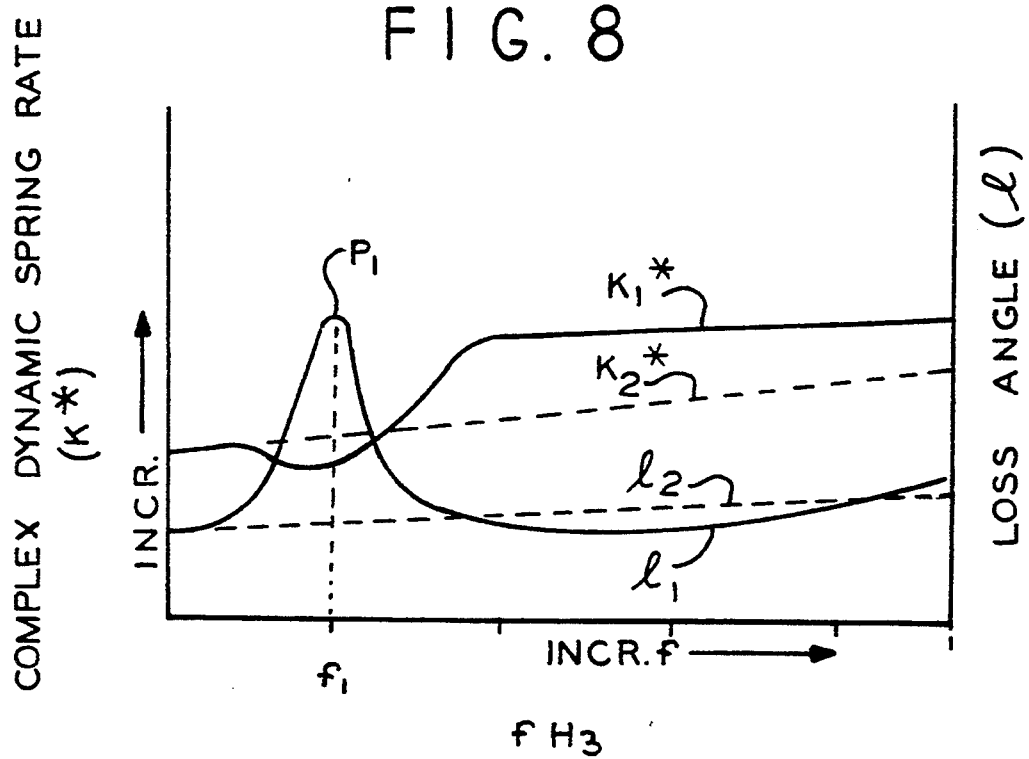
FIGS. 8 and 9 are graphs illustrating respective different effects of the fluid within the ring channel in terms of loss angle and complex dynamic spring rate in the respective embodiments of the rings of FIGS. 5 and 7.

FIG. 8 represents the tuned characteristics in terms of loss angle and complex dynamic spring rate of a tuned hydroelastic bushing 10 employing the ring 40, FIG. 7. The dashed lines in FIG. 8, curves $k^*_2$ and $l_2$ as discussed in the introductory portion, represent an untuned solid rubber bushing manufactured by the assignee of the present invention. Presuming undesired low frequency $f_1$ to be damped by the bushing 10, the prior art untuned bushing is not specifically constructed to damp relatively large magnitude displacements, such as caused by sudden shock loads, at this low frequency. Such displacements at the low frequency, e.g., below 20 Hz, are then transmitted to the second member to be isolated. For example, in automotive applications, the bushing 10 may be used to damp shock loads at an automotive rear suspension system.

The resonant or peak loss angle $P_1$ is specifically tuned to occur at frequency $f_1$ in bushing 10 with a ring 40, FIG. 7. The loss angle amplitude is significantly increased at this frequency and further damps displacements between the inner and outer tubes of the bushing as compared to an untuned solid rubber bushing. The spring rate $k^*$ decreases as the loss angle 1 increases and is known as the notch effect. The significantly increased loss angle compensates for the less significant reduced spring rate.

The reduced spring rate does not isolate low frequency large displacement shock loads effectively. This reduced spring rate results, unless otherwise provided for, in the inner tube, for example, "bottoming out", i.e., transmitting the shock load to the outer tube. This shock load is, however, effectively damped by the hydraulic shock absorbing effect of the fluid pumping between the chambers 27. The spring rate increases at higher frequencies over a solid rubber bushing and further stiffens the system in the presence of reduced loss angle at the higher frequencies. A stiffened system at the higher frequencies is not desirable as the stiffening serves to transmit higher frequency vibrations. This problem is dealt with as explained below.

Tuning of the bushing is accomplished in a known way. Specifically, tuning is a function of the length and width of the channel such as channels 25, FIG. 1, and viscosity of the fluid for a given elastomer material. Thus, the depth and width of the depression 42 in ring 40, determines the frequency at which the peak P of FIG. 8 occurs for a given fluid. Frequency of tuning peak $(f) \approx$ cross section area of channel/length of channel. The peak P loss angle is thus set to occur at the desired frequency of the displacement of interest.

The bushing operates dynamically in that as relatively large low frequency displacements displace the inner tube 28 with respect to the outer tube 12, the pockets 18 compress and expand. This compression and expansion forces the incompressible fluid in these pockets to traverse through the channel formed by depression 42 to and between the pockets 18. This action provides damping phenomena in a known manner. The fluid is under relatively high compression load. The relatively high compressive forces of the compressed elastomer member 16 against the outer tube 12 and inner tube 28 seals these elements from fluid leakage without further sealants.

Figure 9:
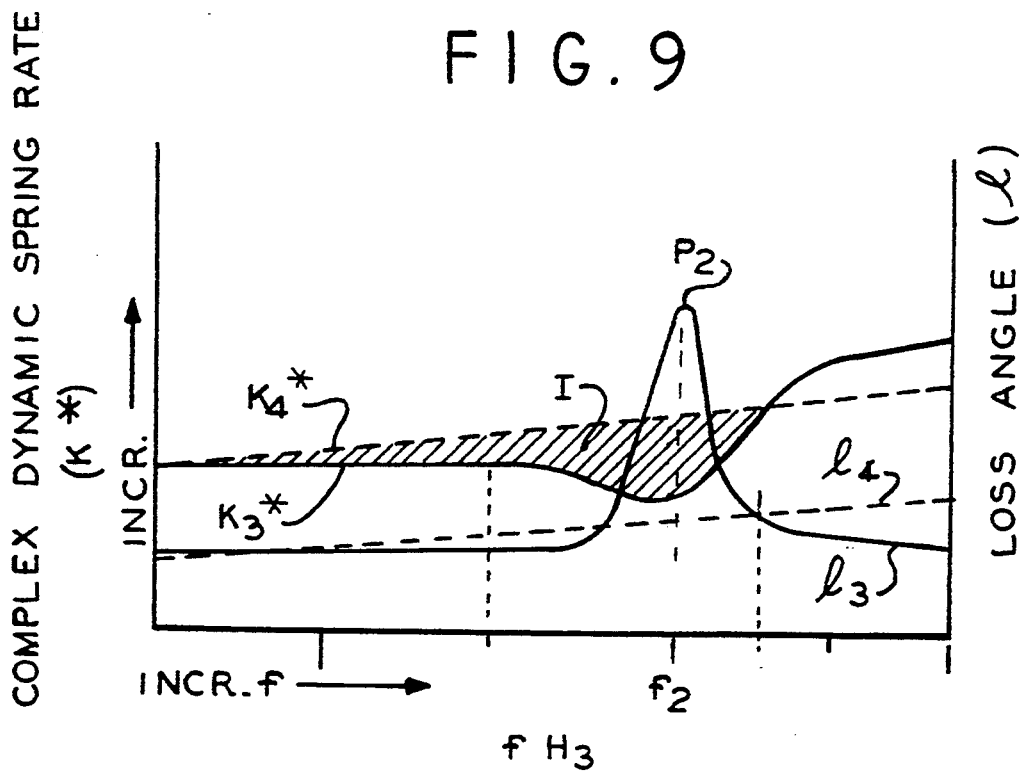

FIG. 9 graphically illustrates the damping action of the ring 22 in bushing 10, FIG. 2. In FIG. 9, the peak $P_2$ occurs at frequency $f_2$ which is significantly higher than the frequency of occurrence of peak $P_1$, FIG. 8. This frequency $f_2$ may for example be in the range of 75 to 125 Hz. However, damping for higher frequencies is not provided by the increased loss angle, because a stiffer system readily transmits higher frequency small displacements. At higher frequencies, what is desired is isolation of the smaller displacements provided by a reduced spring rate. The decreased spring rate $k^*$ is, as explained above, due to the notch effect in the hatched region I between the curve $k^*_4$ of the solid rubber type bushing and the curve $k^*_3$ for the fluid operated bushing 10 with the ring 22.

The decreased spring rate isolates the higher frequency vibrations as compared to a stiffer spring rate, the converse occurring at the low frequency end of the spectrum. It is the reduced spring rate that effects the desired isolation at the higher frequencies, and not stiffening damping effect of the increased loss angle of the bushing. Therefore, the peak loss angle is set somewhat higher than the desired frequency range of the oscillations to be isolated at the higher frequencies, which are typically caused by tire and road noise or similar sources. For example, to reduce high frequency noise in the range of 60–100 Hz, the peak $P_2$ frequency $f_2$ may have a value of 140 Hz.

The important aspect of the present invention is the use of high compression in the elastomeric bushing to eliminate the need for costly and undesirable adhesives and to increase the life of the elastomeric member. Further, the assembly process of forcing the elastomer member into the outer tube and the inner tube into the bore of the elastomer member is simpler and cost effective as compared to molding the elastomer member to the inner tube previously coated with a costly adhesive and then die compressing the outer tube to the ring and elastomer member and inner tube assembly.

It should be understood that the term ring as used in the claims refers to the final configuration of the ring in the assembly, and it is intended that the term ring include segments which together form a complete ring when assembled. Thus the term ring may include two halves as shown in FIG. 5 or a single element as shown in FIG. 7.

Those having skill in the art will appreciate that various modifications and changes to the above embodiments may be made without departing from the spirit and scope of the following claims. The specific descriptions are given by way of illustration and not limitation.

What is claimed is:

1. An incompressible fluid-filled, elastomeric tunable displacement damping or isolating bushing comprising:
   a generally cylindrical, elastomeric member having a central axial bore therethrough defining a bore axis and a given outer diameter, a pair of diametrically opposed pockets in the outer surface thereof;
   a cylindrical ring having at least one peripheral depression in the outer surface thereof and a pair of diametrically opposed apertures therethrough, the at least one depression communicating with the apertures, the ring surrounding the elastomeric member and being located with each aperture congruent with at least a portion of a corresponding different pocket;
   an inner cylindrical member in the elastomeric member axial bore;
   an outer tube surrounding the elastomeric member and the ring, an inner wall of the outer tube engaged with the ring and closing the depression and the apertures of the ring and pockets of the elastomeric member to form, respectively, at least one closed peripheral channel and a pair of closed chambers in communication with the at least one channel and with each other through the at least one channel, the outer tube having an inner diameter smaller than the elastomeric member given diameter for compressing the elastomeric member at least about 15% wherein the elastomeric member locks to the inner member by static friction forces without an adhesive and vulcanization; and
   an incompressible fluid filling the chambers and the channel.

2. The bushing of claim 1 wherein the inner member is a tube and including means for coupling the inner member tube and outer tube to a corresponding support subject to forces which periodically compress the elastomeric member altering the relative sizes of the chambers and in response to the altering pumping the fluid between the chambers through the at least one channel, the periodic compression of the elastomeric member and the pumping of the fluid conjointly damping the transfer of the forces from the one tube to the other tube.

3. The bushing of claim 1 wherein the elastomeric member has an outer circumferential recess in communication with the pockets, the ring seating in the recess.

4. The bushing of claim 3, wherein before assembly of the bushing, the pockets have a first axial width along the member bore axis and the recess has a first axial dimension along the member bore axis, the assembly together of the ring and the elastomeric member axially elongating the member and axially elongating the pockets and the recess until they have, respectively, a second axial width and a second axial dimension, the second axial width being substantially the same as the axial width of the ring, the second axial dimension being substantially the same as the axial dimension of the apertures.

5. The bushing of claim 1 wherein the outer tube is steel and the ring is one of steel or thermoplastic plastic.

6. The bushing of claim 1 wherein the elastomeric material is rubber.

7. The bushing of claim 1 wherein the ring comprises two semicircular halves held together in abutting relation by the outer tube in interference fit with the outer tube.

8. The bushing of claim 1 wherein the ring is a single continuous element.

9. The bushing of claim 1 wherein the elastomeric member has an outer circumferential recess with a bottom wall and in communication with the pockets, the inner and outer surfaces of the ring being substantially circular cylindrical and the peripheral depression is accompanied by a peripheral protrusion on the inner surface of the ring, and the bottom wall of the recess is essentially circular cylindrical, the peripheral protrusion pressing into the bottom wall of the recess.

10. The bushing of claim 1 wherein the ring is a single element and the at least one depression comprises a single continuous depression extending about the ring, said single depression having first and second spaced ends, an aperture being formed in the ring at each said ends.

11. The bushing of claim 10 wherein the single depression is formed into a plurality of helical turns about the ring.

12. A method of making a fluid-filled, elastomeric displacement damping or isolation bushing comprising:
   forming a generally cylindrical, elastomeric member having a central axial bore therethrough and a given outer diameter, and a pair of diametrically opposed pockets in the outer surface thereof,
   forming a cylindrical ring having an outer diameter and at least one peripheral depression in the outer surface thereof and a pair of diametrically opposed apertures therethrough, the at least one depression communicating with the apertures;
   forming an outer tube having a bore with an inner diameter smaller than the elastomeric member given outer diameter and the outer diameter of the ring;
   forcing the ring into the outer tube bore in interference fit therewith, an inner wall of the outer tube closing the depression and the apertures of the ring forming, respectively, at least one closed peripheral channel and a pair of closed chambers in communication with the at least one channel and with each other through the at least one channel;
   axially forcing the elastomeric member into the bore of the outer tube and ring so the outer tube radially compresses and elongates the elastomeric member until the outer tube and ring surround the elastomeric member and the apertures are congruent with at least a portion of the pockets, the outer tube radially compressing the elastomeric member;
   axially forcing an inner cylindrical member into the elastomeric member axial bore; and
   filling the chambers and the channel with an incompressible fluid.

13. The method of claim 12 wherein the forming the elastomeric member includes forming the elastomeric member with an outer diameter sufficiently greater than that of the outer tube so as to radially compress the elastomeric member at least 15%.

14. The method of claim 12 wherein the forming the elastomeric member includes forming the elastomeric member with an outer diameter sufficiently greater than that of the outer tube so as to radially compress the elastomeric member in the range of 15–60%.

15. The method of claim 12 wherein the forming the elastomeric member includes forming the member with an outer diameter greater than that of the outer tube so as to radially compress the elastomeric member to elongate the elastomeric member in the range of 50–100%.

16. The method of claim 12 including forming a circumferential recess in the outer surface of the elastomeric member which communicates with the pockets and seating the ring in the recess during the axial forcing of the member into the bore of the outer tube.

17. A fluid-filled, elastomeric damping bushing comprising:

a generally circular cylindrical, elastomeric member having a central axial bore therethrough and a given outer diameter, a pair of diametrically opposed pockets in the outer surface thereof;

a cylindrical ring comprising one or more elements having at least one peripheral depression in the outer surface thereof and a pair of diametrically opposed apertures therethrough, the at least one depression communicating with the apertures, the ring surrounding the elastomeric member and being located in the outer tube set forth below with each aperture congruent with at least a portion of a different pocket;

an inner tube in the elastomeric member axial bore;

an outer tube surrounding the elastomeric member and the ring, an inner wall of the outer tube engaged with the ring and closing the depression, the pockets and the apertures of the ring to form, respectively, at least one closed fluid tight peripheral channel and a pair of closed fluid tight chambers in communication with the at least one channel and with each other via the at least one channel, the outer tube having an inner diameter smaller than the elastomeric member given diameter for compressing the elastomeric member in the range of 15–60% for securing the elastomeric member to the inner tube without an adhesive and vulcanization; and a liquid filling the chambers and the channel.

18. The bushing of claim 17 including a circumferential recess in the outer surface of the elastomeric member in communication with the pockets, the ring being seated in the recess.

* * * * *